INVENTOR.
Willard E. Hoyler,
BY Geo. P. Kimmel.
ATTORNEY.

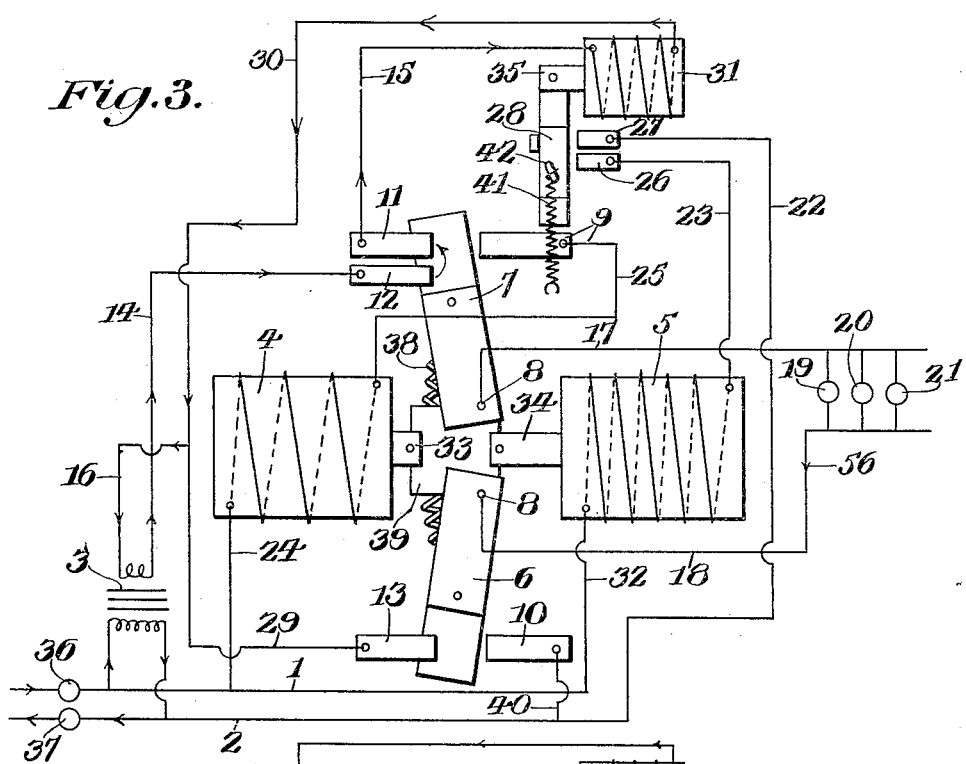

Patented Feb. 25, 1930

1,748,177

UNITED STATES PATENT OFFICE

WILLARD E. HOYLER, OF BUFFALO, NEW YORK

CIRCUIT-PROTECTING SYSTEM

Application filed April 18, 1928. Serial No. 270,987.

This invention relates to a circuit protecting system, and has for its object to provide, in a manner as hereinafter set forth, a system of such class for controlling overloading and short circuiting and further for eliminating the burning out and changing of burned fuses as well as preventing the burning of current carrying conductors when the line is overloaded or shorted.

A current protecting system, in accordance with this invention, is designed primarily to eliminate the trouble of changing burned fuses, as the system will give the circuit the same protection as that obtained from a fuse, i. e., turn off the current when an overload or short circuit occurs.

In the circuits now used for house wiring or running motors in factories, etc., if an overload or short circuit in the line occurs, an excess amount of current flows and if it is not cut off immediately the wires of the house, motors, etc., become red hot and melt. A fuse interposed in the circuit will melt first, however, before such wires, and this shuts off the current. Then it is necessary to go to the meter board or cutout box and replace the burned out fuse with a new one, and if the overload or short circuit is not removed from the line the newly installed fuse will blow out immediately, and if the cover of the fuse is not tight, the flame from the fuse blowing will injure the party putting the fuse in. This has often happened to experienced persons who place a new fuse in position.

A system in accordance with this invention, interposed in the line, will shut off the current when the line is overloaded or shorted, then will turn the current back on when the overload or short is removed. This operation is accomplished automatically and no one is required to expose himself to the danger or inconvenience of going to the meter board or cutout box to position a new fuse. The system will be a great help to the housewife who uses current for many operations day and night. In factories where electric power is used, the system will cut off the current when a machine is overloaded or shorted and all the operator has to do is to turn off the power and the system will turn the current on again. This saves the operator a trip to the meter board or cutout box and further saves him from exposure to high pressure currents.

The system can be used on a generator to cut out an excess current from the line and restore the main line switch when the current is again normal. The system has many other usages but all on the same principle for cutting off current from circuit when the circuit is overloaded or shorted, and then restoring the circuit to normal.

Further objects of the invention are to provide, a current protecting system, in a manner as hereinafter set forth and which is simple in its construction and arrangement, durable, compact, thoroughly efficient in its use, readily installed, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 3 is a diagrammatic view of a circuit protecting system, in accordance with this invention, and showing the adaptation thereof with respect to a line and the path of the current immediately after the short circuit or overload is removed.

Figure 4 is a diagrammatic view of the circuit protecting system, in accordance with this invention, and showing the adaptation thereof with respect to a load circuit and the path of the current after the short or overload is removed and before the circuit is restored to normal conditions.

Figure 1:
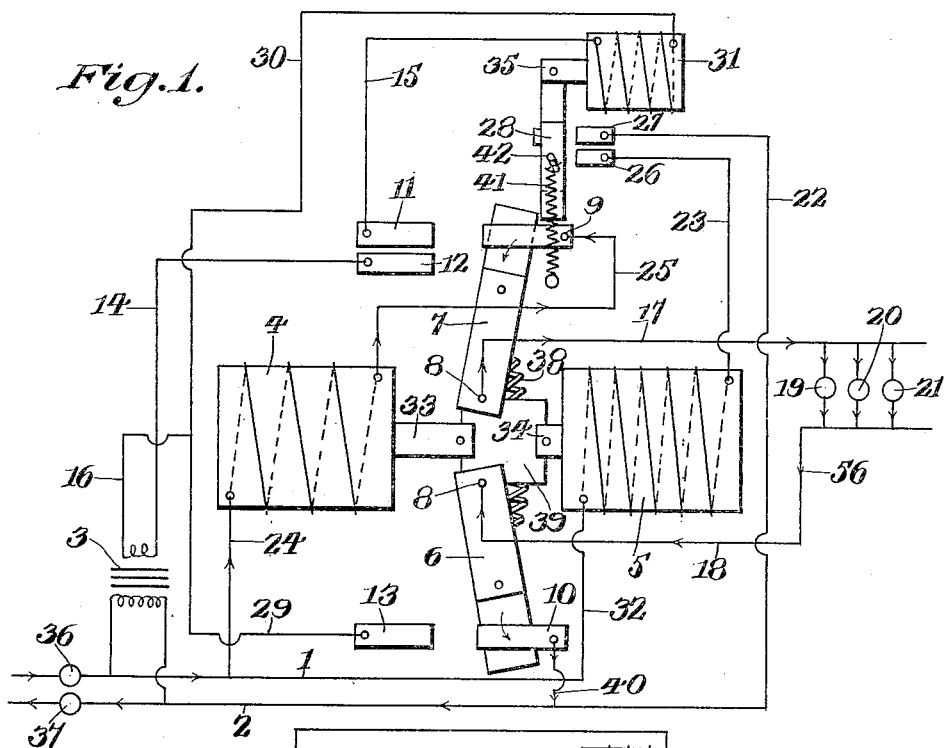
Figure 1 is a diagrammatic view of a circuit protecting system, in accordance with this invention, and showing the adaptation thereof with respect to a line and the path of current when the line is normal.

The circuit protecting system includes a main switching mechanism consisting of a circuit opening solenoid magnet 4 wound with a comparatively few turns of comparatively large size wire according to the voltage used, a circuit closing solenoid magnet 5 wound with comparatively large number of turns of comparatively small size wire according to the voltage used, a pair of blades 6, 7 insulated from each other and insulated from armatures 33 and 34 but fastened with springs 38 to move in unison with armatures 33 and 34. The blades cooperate with contacts 9, 10, 11, 12, and 13. The blades 6, 7 simultaneously coact with contacts 10 and 9 respectively. The blade 7 simultaneously coacts with contacts 11, 12 when blade 6 coacts with contact 13. The contacts 11, 12 are arranged in close parallel spaced relation.

A third or controlling solenoid magnet 31 wound to operate on a comparatively lower voltage than the line, load or other two solenoid magnets, is provided to close a normally open actuating circuit for magnet 5 in order to restore load circuit to normal conditions after short or overload is removed.

A transformer 3 to lower line voltage is employed to operate magnet 31. But it is obvious that any form of switch capable of operating to obtain the purpose of the invention may be employed.

In Figure 1, the blades 7 and 6 are illustrated as an engagement with the contacts 9 and 10 respectively when the load in the load circuit is normal.

The line wires are indicated at 1 and 2, and the former leads to solenoid 4 by a branch 24 and also to solenoid 5 by a branch 32. The line 2 leads to contact 10 by a branch 40 and also to contact 27 by a branch 22.

The primary of transformer 3 is connected across 1 and 2. This permits a secondary current to be used to ring bells while load circuit is normal. From the secondary of transformer 3 a branch 16 leads to branches 30 and 29, the former leads to one side of solenoid magnet 31 and the latter leads to contact 13.

A branch 14 leads from the other side of the secondary of the transformer 3 to contact 12.

A branch 17 leads from blade 7 to one side of load circuit and terminates in a plurality of load branches 19, 20, 21, which extend to a branch 18 leading to blade 6. A branch 25 connects the other side of solenoid 4 to contact 9. A branch 15 connects contact 11 with the other side of solenoid 31. A branch 23 runs from contact 26 to solenoid 5. The blade 7 connects contacts 11 and 12 together when blade 7 is drawn by solenoid 4. An auxiliary switch device or blade 28 connects contacts 26 and 27 when armature 35 is drawn by solenoid 31.

The armatures 33, 34 are connected together by a coupling member 39, of brass, copper or other non-magnetic material. The blade 28 has connected thereto a spring 41 for holding it clear of contacts 26 and 27 when the solenoid 31 is not operating. The pivot for blade 28 is indicated at 42. As illustrated lines 1 and 2 have interposed therein fuses 36 and 37 respectively and which may be employed for additional safety if desired.

With respect to Figure 1 the path of current when load circuit is normal is indicated by the arrows 56 and is as follows:—Line wire 1, branch 24, solenoid 4, branch 25 to contact 9, through blade 7 to branch 17 to terminate in a plurality of load branches 19, 20, 21 which extend to branch 18 to blade 6, contact 10, branch 40, line 2, solenoid 4 is weak because of comparatively few turns of wire and normal load current and cannot attract its armature 33.

Figure 2:
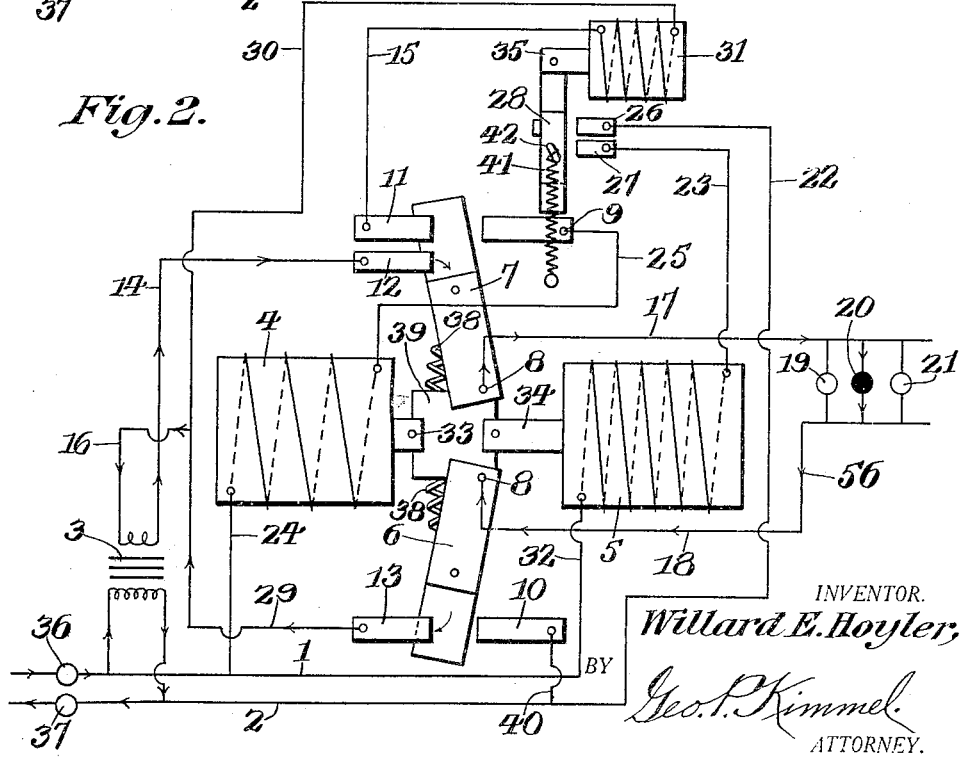
Figure 2 is a diagrammatic view of a circuit protecting system, in accordance with this invention, and showing the adaptation thereof with respect to a line and showing the path of current when the line is overloaded or short circuited.

Figure 2 illustrates the path of current when a short or overload occurs, solenoid 4 has become strong by the rush of current caused by the short or overload, and shifted blades 6 and 7 to position shown in Figure 2, current from secondary of transformer 3 of a lower voltage than the line voltage or load voltage now flows along branch 14 to contact 12, blade 7 then either to solenoid 31 or else to short or overload 20, and as overload 20 has a lower resistance than solenoid 31 said current naturally flows over blade 7, branch 17 to short or overload 20, branch 18, blade 6, contact 13, branch 29, branch 16 to secondary of transformer 3. Practically no current flows through solenoid 31. The primary of transformer 3 is connected permanently across lines 1 and 2. Load circuit is disconnected from line wires 1 and 2 and no current of supply or line wires passes to load circuit during short or overload period.

Figure 3 illustrates path of current of a lower voltage than the line voltage immediately after the short or overload is removed from load circuit. Current from secondary of transformer 3 goes over branch 14 to contact 12, blade 7. The current has its choice of going to the load circuit over blade 7, branch 17, loads 19, 20, 21 to branch 18, blade 6, contact 13, branch 29, branch 16, to transformer 3 or along blade 7, contact 11, branch 15 to solenoid 31 and as solenoid 31 is now the line of the least resistance for the said lower voltage, said current goes from blade 7, to contact 11, branch 15, solenoid 31, branch 30, branch 16 to secondary of transformer 3. This causes solenoid 31 to attract its armature 35 to the position shown in Figure 4, thus tipping 28 over its center, 28 now connects contacts 26 and 27 together.

With reference to Figure 4 the paths of currents are illustrated. The lower voltage than the line voltage or load voltage is still the same as Figure 3. The line current or resetting current comes along line 1, branch 32, solenoid 5, branch 23, contact 26, blade 28, contact 27, branch 22 to line 2. Solenoid number 5 becomes energized and attracts its armature 34 thus shifting blades 6 and 7 to position shown in Figure 1 and the system is in position for a normal load.

The arrangement as described provides a pair of circuits leading from the transformer for feeble currents, one of said circuits, indicated by the arrows in Figure 2 sending to the load circuit a feeble current of less voltage than that of the load voltage and thence to the overload or short until the load circuit becomes normal, and the other of said circuits, indicated by the arrows on Figures 3 and 4 energizing the controlling magnet 31 by a feeble current of lower voltage than the load circuit and of a different value with respect to the first feeble current. The energizing of magnet 31 operates the auxiliary switch device 28 to close the actuating circuit for the closing magnet 5. The actuating circuit is provided by the branches 22, 23 leading from spaced contacts 26, 27 to magnet 5 and line wire 2.

The system provides means whereby a solenoid magnet will cut off the heavy current and send a feeble current of a lower voltage than the line voltage to the short or overload, and then divert the said feeble current through a second solenoid magnet when short or overload is removed from the load circuit, and said second solenoid magnet will actuate a switch and close the circuit of a third solenoid magnet and said third solenoid magnet will close the main switch and restore the system to normal working condition. Said third magnet opens circuit of itself and opens circuit of second magnet by shifting blades 6 and 7, and by such operation overloading and short circuiting is controlled, the circuit protected, and the system provides means for eliminating the burning out and changing of burned fuses, as well as preventing burning of current carrying conductors when the line is overloaded or shorted.

This system cuts off the comparatively high voltage of the line from the load circuit and uses a comparatively lower voltage than the line voltage or load voltage as a feeble current, thus a low harmless voltage is in the load circuit when the latter is short or overloaded.

It is thought that the many advanages of a current protecting system, in accordance with this invention, can be readily understood, and although the preferred embodiment of the system is as illustrated and described, yet it is to be understood that changes in the arrangement of the system can be had which will fall within the scope of the invention as claimed.

What I claim is:—

1. A protecting system for a load circuit comprising a main switching mechanism for electrical connection therewith and including a circuit opening magnet actuated from the load circuit when the latter is overloaded or shorted to provide for said mechanism automatically cutting off heavy currents from the load circuit, said mechanism further including a closing magnet to provide for said mechanism automatically restoring the load current to the load circuit after the overload or short is removed, a normally open actuating circuit for said closing magnet connected with the latter and to the load circuit, an auxiliary switch device for closing said actuating circuit after said switching mechanism has been opened, a controlling magnet for closing said switch device, a transformer, two circuits leading from the transformer, one of said circuits sending to the load circuit a feeble current of less voltage than that of the load voltage and thence to the overload or short until the load circuit becomes normal, and the other of said circuits energizing the controlling magnet after the overload or short is removed by a feeble current of lower voltage than the load circuit and of a different value with respect to the first feeble current.

2. A protecting system for a load circuit comprising a main switch interposed therein for cutting off the load circuit from the load circuit when the latter is overloaded or shorted and for cutting in the load circuit to the load current when the overload or short has been removed, electrical means including a main switch opening magnet energized from the load current for operating the main switch to cut-off position when the load circuit is overloaded or shorted, electrical means including a main switch closing magnet in a normally open circuit and energized by the load current when the overload or short is removed from the load circuit, electrical means including an auxiliary switch and a controlling magnet therefor energized by a feeble current of less voltage than the load voltage for operating the auxiliary switch to close the normally open circuit of said closing magnet to operate the main switch to cut-in position, and means in electrical connection with the load circuit for sending to the latter, when cut-off from the load current a feeble current of lower voltage than the load voltage and thence to the overload or short until the load circuit becomes normal and for sending another feeble current, of less voltage than the load voltage and of a different value than the other feeble current to said controlling magnet for energizing it to operate said auxiliary switch.

3. A protecting system for a load circuit comprising a main switch interposed therein for cutting off the load current from the load circuit when the latter is overloaded or shorted and for cutting in the load circuit to the load current when the overload or short has been removed, electrical means including a main switch opening magnet energized from the load current for operating the main switch to cut-off position when the load circuit is overloaded or shorted, electrical means including a main switch closing magnet normally in an open circuit and energized by the load current for operating the main switch to cut-in position when the overload is removed from the load circuit, electrical means including an auxiliary switch and a closing magnet therefor to close the circuit of said main switch closing magnet, a transformer, and electrical connections leading from the transformer for sending to the load circuit when cut off from the load current a feeble current of lower voltage than the load voltage and thence to the overload or short until the load circuit becomes normal and then for sending another feeble current, of less voltage than the load voltage and of a different value than the other feeble current to said auxiliary switch closing magnet for energizing it to operate said auxiliary switch to cut-in position to close the circuit for the closing magnet.

4. A protecting system for a load circuit comprising a main switch interposed therein for cutting off the load current from the load circuit when the latter is overloaded or shorted and for cutting in the load circuit to the load current when the overload or short has been removed, electrical means including a main switch opening magnet energized from the load current for operating the switch to cut off position when the load circuit is overloaded or shorted, electrical means including a main switch closing magnet energized by the load current for operating the main switch to cut-in position when the overload or short has been removed, electrical means including an auxiliary switch and a controlling magnet therefor energized by a feeble current of a lower voltage than the load voltage, and means in electrical connection with the load circuit for sending to the latter, when cut off from the load current a feeble current of lower voltage than the load voltage and thence to the overload or short until the load circuit becomes normal and for sending another feeble current of less voltage than the load voltage and of a different value than the other feeble current to said controlling magnet for energizing it to operate said auxiliary switch to cut-in position, said means in electrical connection with the load circuit being so arranged that no current flows through the controlling and closing magnets when load is normal, and resilient elements for completing, after being initially started the movements of said switches.

5. A protecting system for a load circuit comprising a main switch interposed therein for cutting off the load current from the load circuit when the latter is overloaded or shorted and for cutting in the load circuit to the load current when the overload or short has been removed, electrical means including a main switch opening magnet energized from the load current for operating the main switch to cut-off position when the load circuit is overloaded or shorted, electrical means including a main switch closing magnet normally in an open circuit and energized by the load current for operating the main switch to cut-in position when the overload is removed from the load circuit, circuit closing means for said closing magnet, and means in electrical connection with the load circuit for sending to the latter, when cut off from the load current a feeble current of lower voltage than the load voltage and thence to the overload or short until the load circuit becomes normal and then for sending another feeble current, of less voltage than the load voltage and of a different value than the other feeble current to operate the said circuit closing means to close the circuit for said closing magnet.

In testimony whereof, I affix my signature hereto.

WILLARD E. HOYLER.